UNITED STATES PATENT OFFICE.

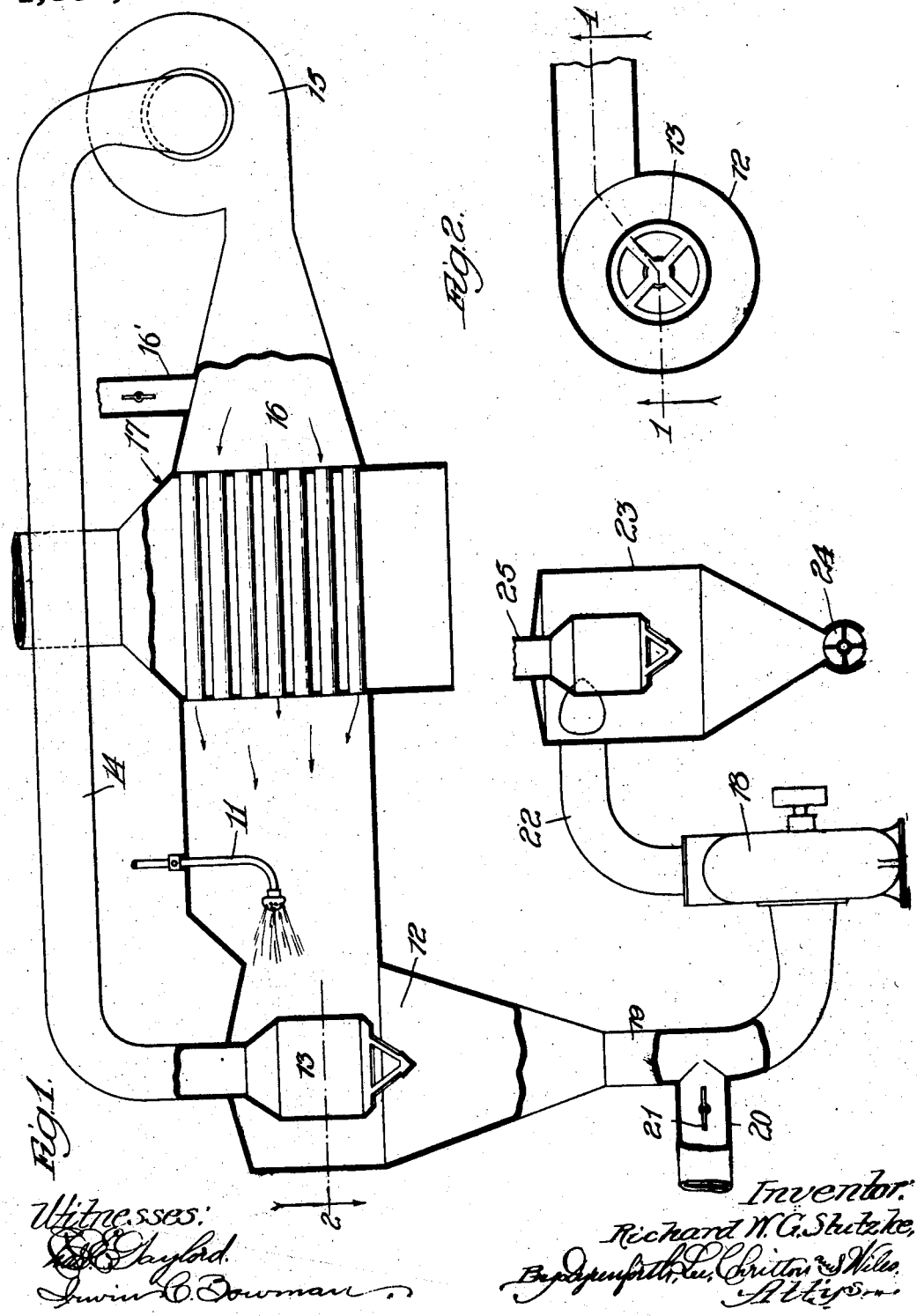

RICHARD W. G. STUTZKE, OF CHICAGO, ILLINOIS, ASSIGNOR TO THE G. A. BUHL COMPANY, OF CHICAGO, ILLINOIS, A CORPORATION OF ILLINOIS.

ART OF DESICCATING MILK AND THE LIKE.

1,350,248.      Specification of Letters Patent.      Patented Aug. 17, 1920.

Application filed July 9, 1917. Serial No. 179,490.

*To all whom it may concern:*

Be it known that I, RICHARD W. G. STUTZKE, a subject of the Emperor of Germany, residing at Chicago, in the county of Cook and State of Illinois, have invented new and useful Improvements in the Art of Desiccating Milk and the like, of which the following is a specification.

My invention relates to the art of desiccating fluid substances, and more particularly milk, eggs, blood and other albuminous compounds, which are said to be chemically altered by the application of temperatures below the boiling point of water.

My invention will be fully understood from the following specification taken in connection with the accompanying drawings, in which—

Figure 1 is a diagrammatic side elevation, partly in vertical section, of one form of apparatus embodying my invention, and Fig. 2 is a section on the line 2 of Fig. 1.

Referring more particularly to the drawings, the numeral 10 designates a horizontal drying chamber into which the fluids to be desiccated are introduced, preferably by means of an atomizer, or spray-nozzle, 11. The chamber 10 discharges into the tangential inlet of a cyclone dust-collector 12, the central outlet member 13 of which communicates through a conduit 14 with the inlet side of a centrifugal blower 15. The outlet side of the blower opens into an enlarging conduit 16, which in turn communicates with the inlet side of a horizontal tubular heater 17, the tubes of which are heated by furnace gases, or by direct firing, or in any other suitable manner. A valved vent passage 16¹ opens out of the conduit 16.

The apparatus above described constitutes a vented circulating system of the general form described in my prior Patent No. 1,215,889, of February 13, 1917.

My present invention is more especially concerned with means for discharging dried solids from the circulating system, such means comprising a centrifugal blower 18, the inlet side of which is connected by a conduit 19 with the base of the primary collector 12, this conduit having a branch pipe 20 tapped thereinto and provided with a regulating valve 21. The outlet side of the blower 18 communicates through a conduit 22 with the tangential inlet of a final collector 23 of the cyclone type, this last collector having a four-armed self-sealing dumping gate 24 at its base. The gas outlet 25 of the final collector 23 may discharge directly to the atmosphere.

The operation of my improved apparatus is as follows: The tubes of the heater 17 are brought to a proper operating temperature, and the main blower 15 being set in operation, the contents of the circulatory system is set in motion in the direction indicated by the arrows. Water is introduced through the spray-nozzle 11, and by contact with the heated air becomes volatilized. The exhaust blower 18 being put in operation, and supplementing the vent 16¹ gas is withdrawn from the circulatory system at such a rate as to prevent rise of pressure therein, and through the continued injection of water the air initially contained within the system is gradually replaced by water-vapor, which in its circulation becomes superheated in the tubes of the heater 17, and therefore capable of volatilizing a further quantity of liquid injected through the spray-nozzle 11. The valve 21 in the air-inlet pipe 20 is now opened to such an extent as to supply a predetermined number of volumes of air for each volume of superheated water-vapor withdrawn from the base of the primary collector 12. The air admitted to the conduit 20 may be atmospheric air, or may be previously heated air. By the use of air heated to a moderate temperature the volume of the diluting air may be substantially reduced. By proper regulation as to temperature and volume, the mixture entering the final collector 23 will be reduced to a moderate temperature and will contain less water than is required for the saturation of the air at that temperature. The valve in the vent pipe 16¹ may be closed and the entire volume of vapor which must be discharged to maintain a constant pressure within the system may pass outward from the base of the collector 12. I prefer however to vent the greater proportion of the vapor from the regular orifice, permitting only a small proportion to pass from the base of the collector, this small amount being ample to carry off the dried solids.

Proper operating conditions having been established in the manner described, the substance to be desiccated, for example milk, will be introduced through the spray-nozzle 11, and will have its water content instantaneously volatilized by contact with the current of superheated steam, which it meets in the drying chamber 10. The resulant dried solids will be precipitated to the base of the primary collector 12 and will pass outwardly through the conduit 19, being carried by the vented current of superheated steam, the volume of which will be dependent solely upon the rate of introduction of the milk through the spray-nozzle 11. In the conduit 19 the superheated steam carrying the dried milk solids in suspension will become admixed with the diluting air and its temperature will be substantially reduced. The mixed gas, now being in fact unsaturated air of moderate temperature is discharged into the final collector 23 where it precipitates the dried milk solids to the bottom of the same and is vented to the atmosphere, or, if desired, to a second collecting device through the conduit 25. The dried milk solids may be continuously removed from the system by the dumping-gate 24.

As a specific example of the method of employing my process, the following may be given: The temperature of the superheated steam entering the drying chamber 10 from the heater 17 will be maintained at 240° F. By the absorption of heat in the volatilization of the water content of the milk this temperature will be reduced to 220° F. at the outlet side of the drying chamber. Having determined the volume of the water-vapor at 220° F., which is to be continuously vented from the system through the conduit 19 therein, the valve 21 will be so set as to permit the introduction of 4+ volumes of air at a temperature of 122° F., and of a saturation of 12%. The admixture of this quantity of air will reduce the temperature of the mixed gas to approximately 140° F., with a resulting air saturation of 100%—.

The process and apparatus above described is particularly valuable for the treatment of milk and the like albuminous substances, in that the drying is instantaneously effected in an atmosphere of superheated water-vapor. By reason of the absence of free oxygen in this atmosphere, all danger of oxidation is avoided, and furthermore the drying is accomplished so quickly that there is no opportunity for the albumen to be coagulated. Having accomplished the drying of the albuminous substances without chemical change thereof, it becomes important to remove the dried solids from the heated circulatory system as quickly as possible, in order that they may not become cooked or otherwise changed by prolonged contact with the superheated vapors, or with the hot walls. To keep them in the desired dried condition, however, it is essential that the water-vapor which carries them, and which occupies the voids between the particles, shall be displaced by air, without being permitted to condense. This result is accomplished by withdrawing the dried solids, together with a certain proportion of the superheated water-vapor, from the circulatory system, and diluting this mixture with air in the manner described, whereby the temperature is substantially reduced, and the carrying atmosphere becomes in effect unsaturated air. The final collection of the solids may therefore take place in a relatively cool receptacle, such as the final collector 23, and the collected solids may be cooled to atmospheric temperature without again becoming wet, by reason of the fact that they are now mixed with air and not with water-vapor.

While I have described in considerable detail one specific embodiment of my invention, it is to be understood that this is illustrative only, and that the invention is not limited to the details of procedure and apparatus described, except in so far as such limitations are included within the terms of the accompanying claims, in which it is my intention to claim all novelty inherent in my invention as broadly as is permissible, in view of the prior art.

What I claim as new is:

1. The method of desiccating fluid substances, which consists in subjecting said substances in finely divided form to the action of a current of superheated water-vapor, subsequently admixing said current with air, and collecting the resultant dried solids from the mixture.

2. The method of desiccating fluid substances, which consists in subjecting said substances in finely divided form to the action of a current of superheated water-vapor, effecting a preliminary concentration of the resultant dried solids in a portion of the said current, admixing the concentrated stream of solids and water-vapor with air, and collecting the solids in such admixed stream.

3. The method of desiccating fluid substances, which consists in subjecting said substances in finely divided form to the action of a circulating current of superheated water-vapor, concentrating the resultant dried solids in a portion of the said current, withdrawing said portion from the circulatory system, admixing it with air, and collecting the suspended solids from the mixture.

4. The method of desiccating fluid substances, which consists in subjecting said substances in finely divided form to the action of a circulating current of superheated water-vapor, effecting a preliminary collection of the resultant dried solids within the circulating system, venting the collected solids from the system in suspension in a discharging current of superheated water-vapor, and effecting the final collection of the said solids from said discharging current.

5. The method of desiccating fluid substances, which consists in subjecting such substances in finely divided form to the action of a circulating current of superheated water-vapor, preliminarily collecting the resultant dried solids within the circulating system, venting the collected solids from the system in suspension in a discharging current of superheated water-vapor, admixing the said current with air, and effecting a final collection of the dried solids from said admixed current.

6. The method of desiccating liquids containing albuminous substances such as milk, which consists in subjecting said substances in finely divided form to the action of a circulating current of superheated water-vapor, preliminarily collecting the resultant dried solids within the circulatory system, venting the collected solids from the system in suspension in a discharging current of superheated water-vapor, admixing said current with air, and finally collecting the suspended solids from the admixed current.

7. An apparatus for the desiccation of fluid substances and comprising a circulating system, means for setting up a circulation within the said system, means for heating the circulating medium, means for introducing the fluid to be desiccated in finely divided form into the circulating medium, means for effecting a concentration of the resultant dried solids, and means for discharging said concentrated solids from the circulatory system in suspension in a discharging current of the desiccating medium.

8. An apparatus for the desiccation of fluid substances and comprising a circulatory system, means for setting up a circulation within the system, means for heating the circulating medium, means for introducing the said fluid substances in finely divided form into the said circulating medium, means for effecting a concentration of the resultant dried solids within the circulatory system, means for discharging the concentrated solids from the system in suspension in a discharging current of the circulating medium, means for admixing air with said discharging current, and means for collecting the suspended solids from the admixed stream.

RICHARD W. G. STUTZKE.